July 21, 1942.                J. H. WILLIAMS                2,290,515
                       WELDING END PLUG FOR PIPING
                         Filed July 24, 1940
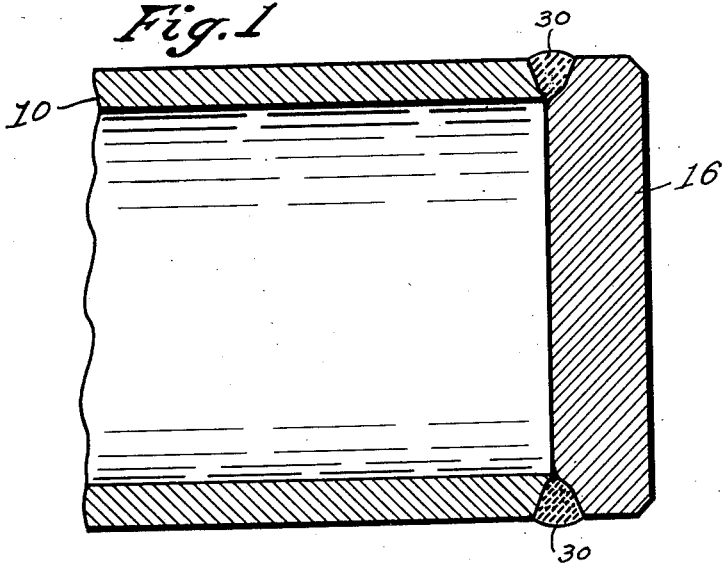
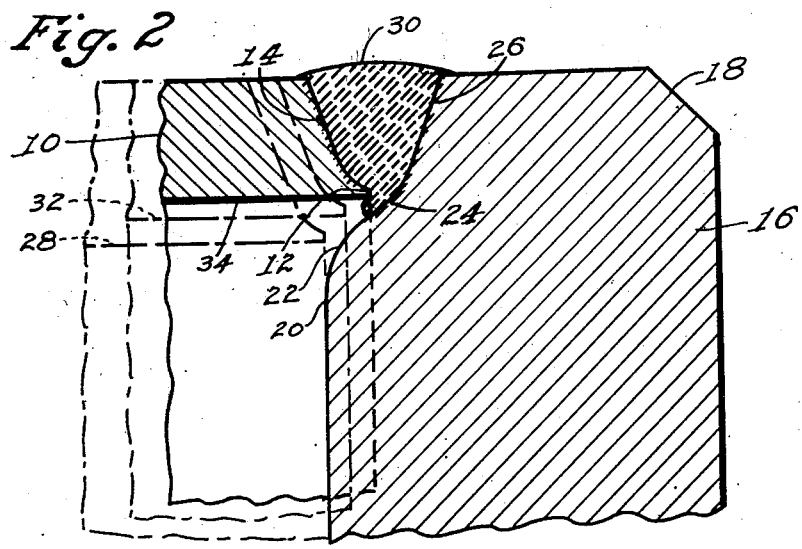
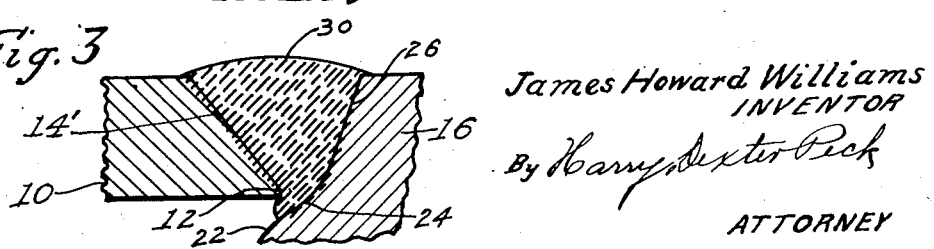
James Howard Williams
INVENTOR
By Harry Dexter Peck
ATTORNEY

UNITED STATES PATENT OFFICE 2,290,515

WELDING END PLUG FOR PIPING

James Howard Williams, Providence, R. I., assignor to General Fire Extinguisher Company, Providence, R. I., a corporation of Delaware Application July 24, 1940, Serial No. 347,113

2 Claims. (Cl. 220—67)

This invention relates to improvements in welding end plugs for piping.

During the fabrication of a system of piping wherein the pipe sections and fittings are for the most part welded together, it is sometimes necessary to close the end of such a pipe or tubular section by means of a plug. It is an object of my invention to provide such a plug and more especially to provide a plug with a surface which can be presented to pipe of many thicknesses to provide a proper circumferential groove for the welding material and to do this even though the thickness of the pipe walls may vary widely. Piping or tubing which is welded together or to different fittings is more or less standard as regards its outside diameter, but its wall thickness may vary considerably depending upon the specifications adopted by the user of the piping. An important object of my invention is to provide an end plug so shaped that it can be used with varying thicknesses of pipe wall which occur in piping or tubing of a standard outside diameter.

The best mode in which I have contemplated applying the principles of my improvements is shown in the accompanying drawing, but it is to be deemed merely illustrative for it is intended that the patent shall cover by suitable expression in the appended claims whatever features of patentable novelty exist in the invention disclosed.

In the accompanying drawing:

Figure 1 is a median longitudinal section through a pipe or tube whose end is closed by a plug embodying my invention;

Figure 2 is a similar partial section on an enlarged scale; and

Figure 3 is another such section showing a modified form of chamfer on the pipe.

Referring to the drawing, and particularly to Figures 1 and 2, a portion of a pipe 10 is shown in section with its edge chamfered for welding. As here particularly disclosed, the innermost portion of the pipe edge is provided with a flat "land" 12 (see Fig. 2) from the outer edge of which the pipe wall curves outward and then continues as a cone surface 14 making about a 70° angle with the longitudinal axis of the pipe. In Figure 3 the pipe edge shown is also provided with a land 12 but here the pipe wall is sloped directly outward on a cone surface 14' making about a 52½° angle with the pipe axis. Obviously the shape of the pipe edge is not critical and may be prepared as desired.

My improved plug has a cylindrical body portion 16 with or without a beveled edge 18 at its outer end and having a particularly designed chamfer at its inner edge. Starting at a point such as 20 (see Fig. 2) well within the diameter of a pipe or tube of the maximum wall thickness likely to be encountered, the inner face of the plug curves convexly as at 22 and then concavely as at 24, finally terminating in a conical surface 26. As here shown, this likewise makes an angle of about 70° with the longitudinal axis of the pipe, but the angle of this cone surface is not critical.

The major advantage of my improved plug resides in the convex-concave (or what might be called the compound) curved portion of the inner surface, because it enables the plug to be used with pipes of different wall thicknesses. For example, in Figure 2, the pipe wall 28 of greatest thickness (like that shown in Figure 1) is shown in dot-and-dash outline in the position it might be placed relative to the plug 16. Its land is shown separated slightly from the face of the plug to allow fusion and penetration of the fused metal to the bottom of the weld. Obviously the edge of the land could be in contact with the face of the plug if desired. But whether in contact or slightly spaced away, as indicated in the drawing, the relation between the pipe end and the reversely curved surface of the plug provides a suitable groove to receive welding material 30 and make a satisfactory welded connection.

Likewise if the pipe wall is not quite so thick, as indicated at 32 in Figure 2, the same desirable relation between the pipe end and the plug is attained because the curved surface of the plug enables the latter to be inserted to a greater extent, relative to the pipe edge, until the land on the pipe is either in contact with the plug surface or slightly spaced therefrom as shown. And finally, even with a pipe having a still thinner wall as shown at 34 in Figure 2, the same desirable relation of surfaces is made possible, because the curved face of the plug permits it to be still further inserted, relative to the pipe, and thus provide the desired groove for the welding material.

If the pipe is placed in contact with the plug, the land on the pipe and the curved surface of the plug aids in the proper positioning of the latter to insure alignment of its outer cylindrical surface with the outside pipe surface. If the pipe is to be slightly spaced from the end plug as shown in the drawing, then it is desirable to use spacer gages of wire or other metal between the plug and the pipe and a straight edge on the outside surfaces to insure of their correct alignment.

By providing a welding end plug with a curved inner face as disclosed, one such plug may be used for piping or tubing of standard outside diameter, but with many different thicknesses, because, regardless of the thickness of the wall of such pipe, the plug can be used with complete assurance that the proper groove for the welding material will be presented to the welder.

I claim:

1. An end plug to be welded to a tubular element to close an opening thereof, said plug having a central portion of a diameter less than the inside diameter of the said opening, a convexly curved portion of increasing diametrical dimension extending outwardly from the edge of said central portion, a concavely curved portion of increasing diametrical dimension extending outwardly from said convexly curved portion, and a cone-shaped portion of increasing diametrical dimension extending outwardly from the edge of said concavely curved portion; the said curved and cone-shaped portions affording a marginal surface on said plug of increasing diametrical dimension whereby the plug may accommodate itself to a tubular element of predetermined outside diameter regardless of the wall thickness of the said element.

2. An end plug to be welded to a tubular element to close an opening thereof, having its face presented to said element composed of a central flat portion of less diametrical dimension than that of said opening, a convexly curved portion adjacent the edge of the central portion and extending outwardly from said edge with an increasing diametrical dimension, a concavely curved portion adjacent the edge of the convexly curved portion and extending outwardly from the edge of the convexly curved portion with an increasing diametrical dimension and a cone-shaped portion extending outwardly with an increasing diametrical dimension from the outer edge of the concavely curved portion to the outermost edges of said face; the flat portion of said face being of such extent as to be positioned within the opening of and spaced from the inner wall of the tubular element and the remainder of said face cooperating with the end surface of the wall of the said element to provide a groove for welding material.

JAMES HOWARD WILLIAMS.